United States Patent [19]
Takaoka et al.

[11] 3,972,465
[45] Aug. 3, 1976

[54] APPARATUS FOR AND METHOD OF FRICTION WELDING

[75] Inventors: Hikaru Takaoka, Kariya; Takeshi Kubo; Toshihiko Hayashi, both of Ohbu, all of Japan

[73] Assignee: Kabushiki Kaisha Toyoda Jidoshokki Sakusho, Japan

[22] Filed: July 24, 1974

[21] Appl. No.: 491,512

[30] Foreign Application Priority Data
Feb. 21, 1974 Japan............................ 49-20893
July 27, 1973 Japan............................ 48-85183
July 27, 1973 Japan............................ 48-85182

[52] U.S. Cl............................ 228/112; 228/2
[51] Int. Cl.² ........................... B23K 28/00
[58] Field of Search ............... 228/2, 112, 113, 114; 29/470.3; 156/73.5

[56] References Cited
UNITED STATES PATENTS
3,564,703  2/1971  Kiwalle .......................... 29/470.3

*Primary Examiner*—Al Lawrence Smith
*Assistant Examiner*—Margaret M. Joyce
*Attorney, Agent, or Firm*—Browdy and Neimark

[57] ABSTRACT

Apparatus for and method of friction welding two metal workpieces under a relative rotation, being characterized in that two workpieces of metal are welded together with a certain particular phase angle therebetween, and especially in that said particular phase relation is accomplished, without stopping once or discontinuing said relative rotation to adjust said phase angle, by providing an alternative rotating means which is driven independently from rotating means and selectively engageable with said proper rotating means.

6 Claims, 15 Drawing Figures

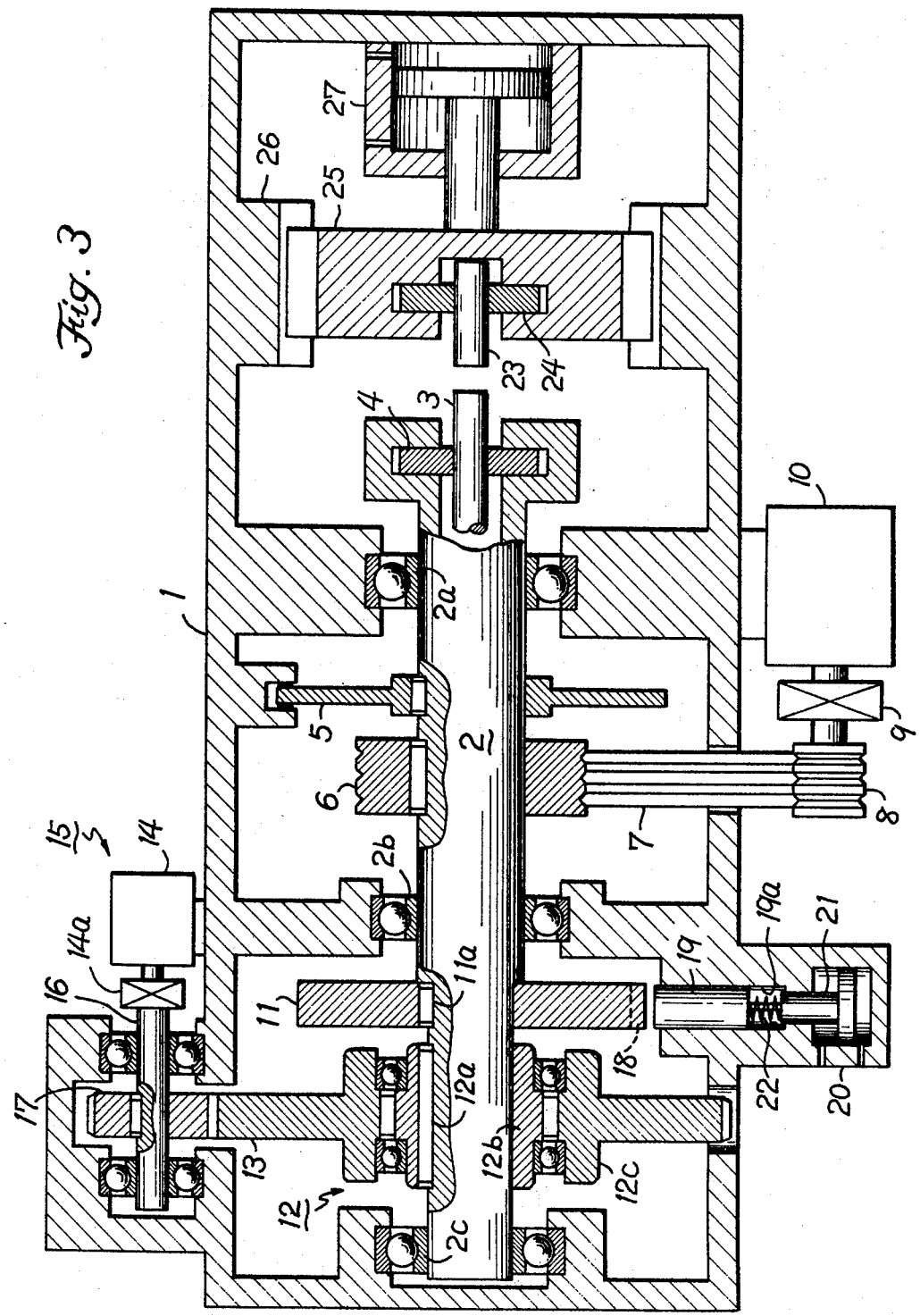

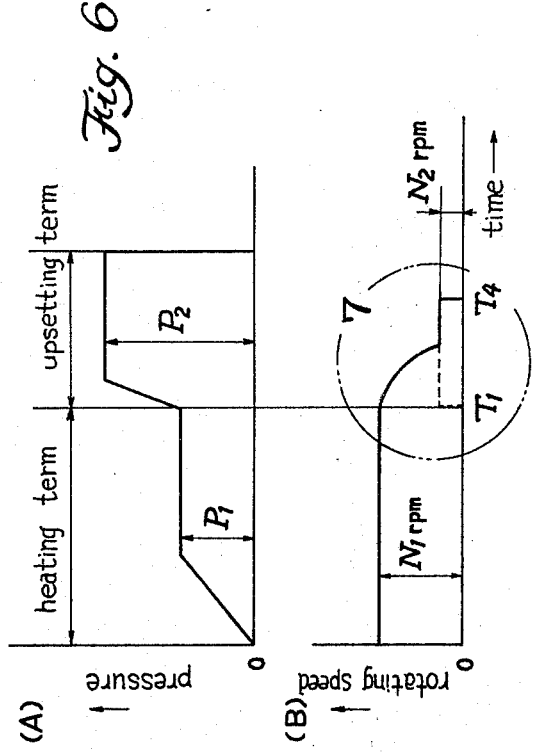
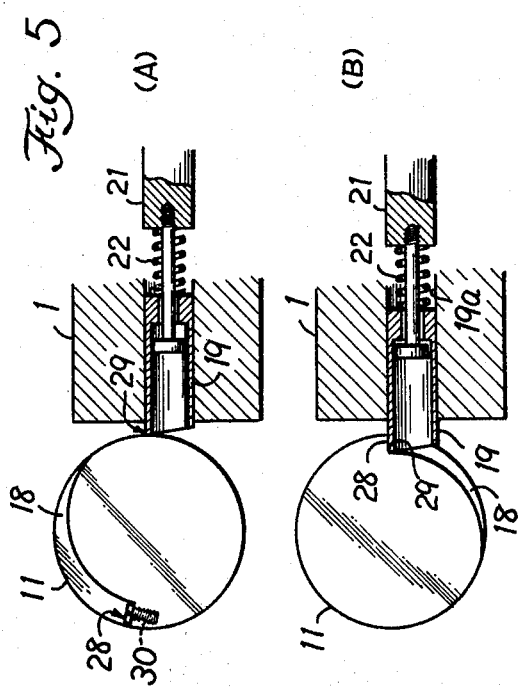
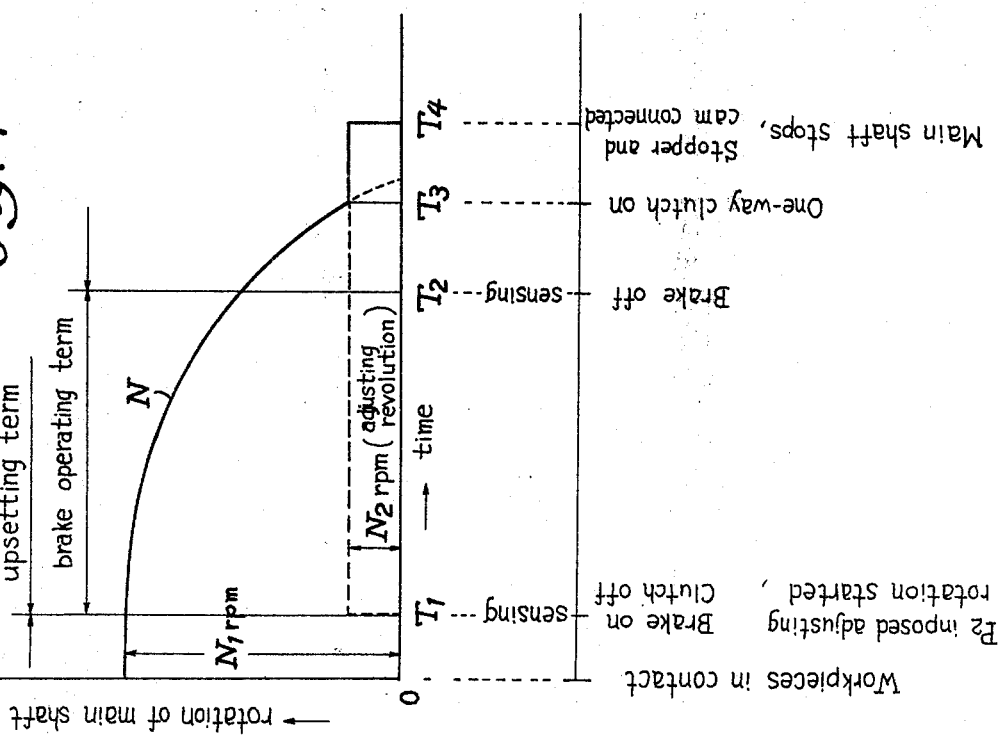

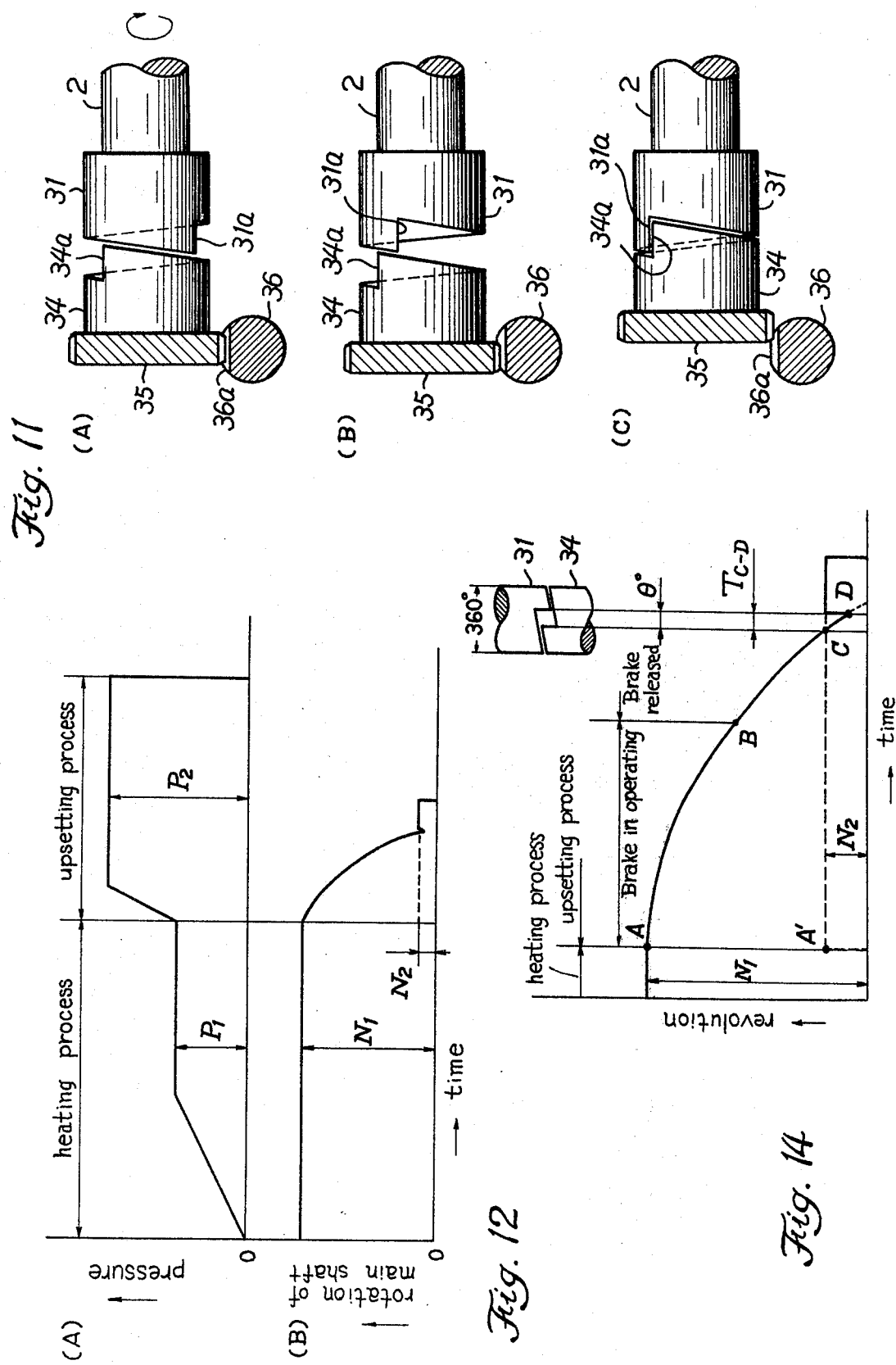

3,972,465

APPARATUS FOR AND METHOD OF FRICTION WELDING

FIELD OF THE INVENTION

The present invention relates to apparatus and method of welding metal workpieces together by using heat generated by friction or by contacting two workpieces to each other under pressure with a relative rotation speed, and more particularly, to the "friction welding" which is completed with a particular phase angle between said workpieces.

BACKGROUND OF THE INVENTION

If two workpieces could be effectively welded together by the friction welding with a certain particular phase angle therebetween, the application range might be increased to a large extent because finished workpieces could be friction welded at once to a final finished product. It has been a long-dreamed technique at least in the conventional frictional welding where two metal pieces are joined by heat generated from relative rotation and a few prior art methods are published, e.g., as Japanese patents, Tokuko-Sho-No. 47-3523, Tokuko-Sho-No. 48-17421 etc. (U.S. Pat. No. 3,705,678 is also published but this is not of a relative rotation type), however, neither of these inventions has been utilized successfully to develop commercial apparatus seemingly due to their inherent defects. In case of the No. 47-3523 invention the phase angle adjustment takes place just after the relative rotation once stops to a standstill; therefore, a slow speed twisting motion is applied again on the workpieces once welded together to adjust phase angle and as the result, the physical properties of the welded part is apt to be much injured and/or to vary in a wide range.

In the case of No. 48-17421 invention the phase angle adjustment is carried out by stopping the relative rotation at a time when at least 360° angle of the rotation is still left enough to complete the phase adjustment before the rotation finally stops, and the speed at the time usually ranges 300 to 700 rpm. Therefore, instant stopping from such a high rotation speed incurs tremendous shock and noise resulting in short life of apparatus and prevention of commercial use.

SUMMARY OF THE INVENTION

The present invention has been developed to eliminate such shortcomings as mentioned above. Accordingly, an object of the present invention is to provide apparatus for and method of adjusting phase angle between two workpieces by introducing an alternate rotating device of a relatively low constant speed and then instantly stopping said workpieces to a standstill.

Another object of the present invention is to provide an apparatus for and a method of adjusting phase angle between two workpieces, which are characterized in that the relative rotation between the two workpieces to be welded never discontinues during said rotation or during one whole welded cycle and exact adjustment of the phase angle is completed just when the relative rotation instantly stops to a standstill.

Another object of the present invention is to provide said apparatus by introducing said alternative rotating device engageable with the proper driving shaft (main shaft) by means of a clutch means to be engaged with having a previously known phase angle, or "one-way clutch".

BRIEF DESCRIPTION OF THE DRAWINGS

FIG. 3 is a similar cross sectional view as FIG. 1 of one embodiment of the present invention.

FIG. 5 (A) and (B) show a vertical cross sectional view of a part around a stopper of the embodiment shown in FIG. 3 in which (A) shows before engagement and (B) after engagement.

FIG. 6 (A) and (B) are graphs showing a characteristic curve of pressure P against time T as (A) and rotating speed N of the main shaft against time T as (B), respectively.

FIG. 7 is a graph showing a charateristic curve of rotation speed N against time T (a part 7 in FIG. 6 is enlargedly shown).

FIG. 11 (A), (B) and (C) show a side view at one of the main shaft partially with a vertical cross section of an alternative driving means at the state of contacting (A), sliding (B) and being engaged (C), respectively.

FIG. 12 (A) and (B) are graphs showing a characteristic curve of pressure P against time T as (A) and that of rotating speed N of the main shaft in FIG. 8 against time T as (B), respectively.

FIG. 14 is a graph showing a characteristic curve of rotation speed N against time T for the embodiment shown in FIG. 13.

DETAILED DESCRIPTION

Figure 1:
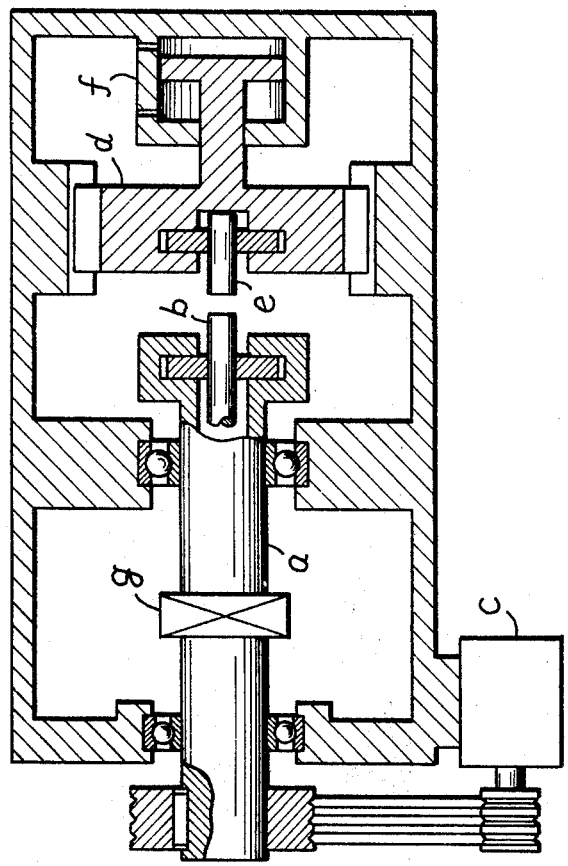
FIG. 1 is a horizontal cross section along the center line of the main shaft of an example of known apparatus.

Before describing preferred embodiments of the present invention a conventional friction welding apparatus shown in FIG. 1 is briefly referred. A workpiece (b) is rotatably chucked by a shaft (a) named main shaft which is driven by a prime mover (c), but selectivley and instantly cut off by a clutch (g), and another workpiece (e) is chucked on a slidable table (d) to which a contacting pressure or an upsetting one is applied by a hydraulic actuator (f).

Figure 2:
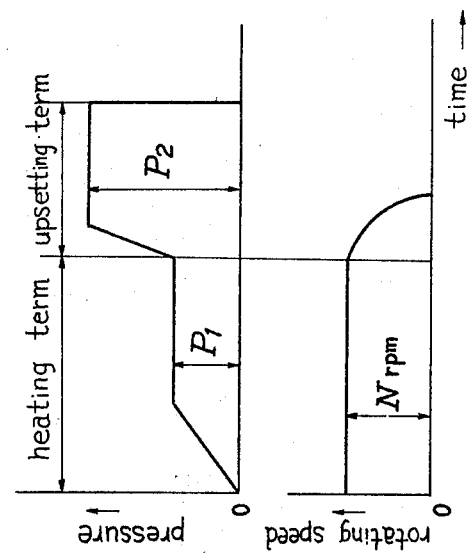
FIG. 2 is a graphic illustration showing characteristic curves of pressure and rotating speed against time.

The variation of pressure, i.e., said contacting pressure $P_1$ and upsetting pressure $P_2$ against passing of time T is shown in FIG. 2 in comparison with the variation of the rotation speed N of the main shaft (a) against T. It is understood that sudden decrease of the rotating speed takes place by releasing the clutch (g) as well as applying a braking force and at the same time when the friction process term shifts to the upsetting term and the contacting pressure $P_1$ does to the upsetting pressure $P_2$.

It is noted that the principal members and their principal function are common to the embodiments of the present invention hereinafter described.

Referring now to FIG. 3 a rotatable shaft 2 (hereinafter named main shaft) which is supported by a few bearings 2a, 2b, 2c, etc., provided on a stationary frame 1 holds a metal workpiece 3 by a chuck 4 mounted on said shaft 2, and can be rotated at a relatively high speed (usually over 2000 rpm) by a motor 10 through a clutch 9, a pair of pulleys 6, 8 operatively connected by a plural number of belts 7, but the speed can be instantly dropped by cutting off the clutch 9 and applying a braking force by a brake 5.

A disk plate cam 11 and an inner race 12b of a one-way clutch 12 are fixedly mounted on the main shaft 2 by keys 11a and 12a, respectively. On the outer race 12c of the clutch 12 is fixed a gear 13 meshing with another gear 17 which is driven by a hydraulic motor 14 through a coupling 14a and a shaft 16. Rotating speed of the gear 13 is relatively low, e.g., 200 rpm and it is understood that the main shaft 2 keeps slipping while it is rotating with a speed higher than 200 rpm but the gear 13 takes the initiative to drive the main shaft 2 when its speed will once come down lower than 200 rpm owing to the function of one-way clutch 12. We call the critical speed (200 rpm) "adjusting speed" and the alternate driving unit "alternate driver" 15 hereinafter, respectively.

On the cam plate 11 as shown in FIG. 5 (A) and (B) there is provided a recessed part 18 having a stopping or positioning surface 28 for mating or hitting on a surface 29 of a stopper 19 which is selectively operated by a piston 21 of a hydraulic cylinder 20 mounted on said frame 1, instantly to stop the rotation of the main shaft 2. The stopper 19 is guided by a hole 19a bored in the frame 1, cushioned by a biasing spring 22 and loosely connected to said piston 21.

Figure 4:
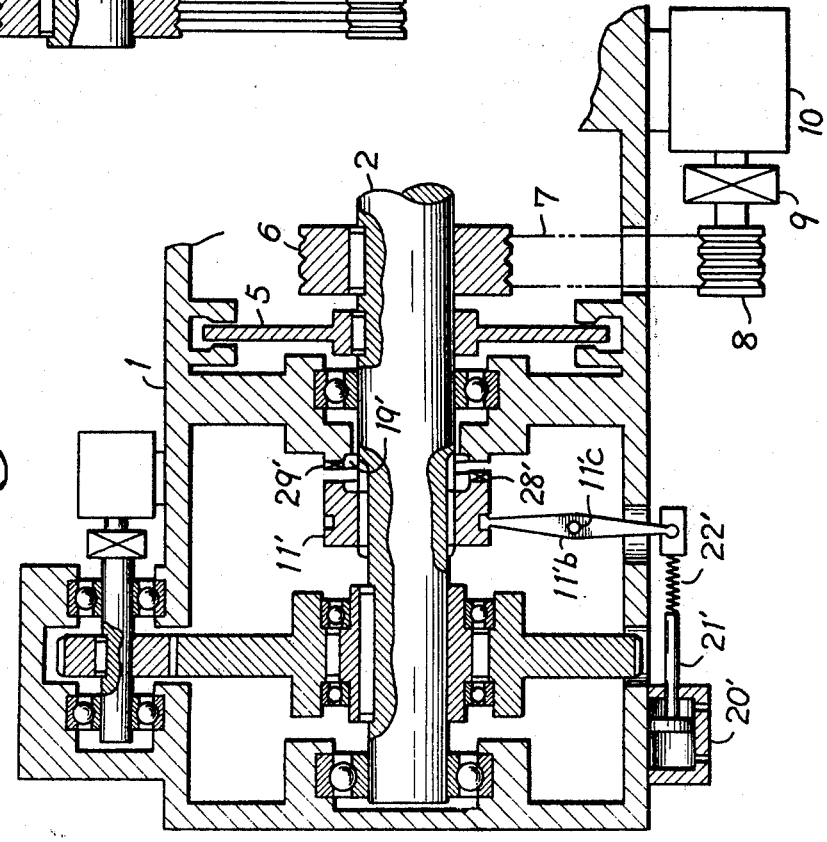
FIG. 4 is a horizontal cross sectional view of a part of another embodiment of the present invention.

As for the positioning mechanism to instantly stop the main shaft 2 which is rotated at a low speed by an alternate driver 15, another embodiment is shown in FIG. 4. The positioning is achieved by bringing an abutting surface 28' of a clutch 11' which is slidable on the main shaft 2, in contact with an abutting surface 29' of a clutch 19' which is fixed on the frame 1. Said clutch 11' can be slidingly shifted by rotating a lever 11'b clockwise which is rotatably supported by a fixed pin 11'c and selectively operated through a spring 22' by a hydraulic piston 21' of a cylinder 20' fixed onto the frame 1. When said abutting surfaces 28' and 29' come into engagement, the main shaft 2 instantly stops.

Referring to FIG. 3 again, the other workpiece 23 firmly held by a chuck 24 fixedly mounted on a table 25 which is slidable coaxially with said main shaft 2 on an auxiliary frame 26 by means of a hydraulic actuator 27 which can impose a controllable pressure, i.e., contacting or upsetting one between the two workpieces 3 and 23. The chucks 4, 24 are preferably provided with angular graduation for phase adjustment.

The operation of the embodiment shown in FIG. 3 will be described hereinafter, referring to FIGS. 6 and 7. The workpieces 3 and 23 are chucked at a fixed phase, the clutch 9 is coupled to drive the main shaft 2 at a predetermined relative speed $N_1$, then the heating process term starts by contacting the two workpieces under a predetermined contact pressure $P_1$, and after a predetermined time duration $T_1$ which can be signaled by timing out of a timer or by sensing the upsetting amount or total length of the workpieces, the upsetting process term starts by releasing the clutch 9, i.e., by cutting input from the prime mover 10, by applying a braking torque by the brake 5 and by increasing the pressure to a predetermined upsetting pressure $P_2$. Thus the rotation speed N of the main shaft 2 decreases rapidly. On the other hand, the hydraulic motor 14 starts to rotate the gear 13 and keeps it rotating at a certain adjusting speed, e.g., 200 rpm.

After a predetermined duration of time $T_2$ from the start of the upsetting term, the brake 5 is released at a speed higher than the adjusting speed, at which the one-way clutch continues slidingly rotating. When the speed of the main shaft drops to a speed not higher than the critical speed, the alternate driver 15 will drive the main shaft 2 in replacement of the proper driving source, the motor 10 due to the function of the one-way clutch 12. As the result, the speed of the main shaft 2 is kept constantly at the adjusting speed, $N_2$. When the rotation speed N of the main shaft 2 becomes equal to $N_2$, i.e., at the moment $T_3$ in FIG. 7, the gear 13 takes over the initiative of driving function for the main shaft 2 and the piston 21 is pushed out by actuating the cylinder 20 in order to engage the stopper 19 with the cam 11 and eventually to stop the main shaft 2 or the workpiece 3 at the predetermined phase angle to the workpiece 23.

In case that the abutting surface 28 is provided at one place on the cam 11, referring to FIG. 5 (A) and (B), the surface 28 must come to abut with the abutting surface 29 within a rotation angle not exceeding 360°, and if two or four abutting surfaces 28 are diagonally provided the abutting or stopping will occur within a rotation angle of 180° or 90°, respectively, of course.

It should be noted that the abutting shock between the stopper 19 and the cam 11 is not serious because the adjusting speed $N_2$ can be controlled at a suitable low value and even in case the speed $N_2$ is set at a relatively high speed, the kinematic energy of the rotating members is kept constant because of the speed $N_2$ being kept constant, therefore most of the total energy of rotation can be absorbed by a suitable known shock absorber means 30 shown in FIG. 5, without affecting the phase relation between the two workpieces when they stop. (If the kinematic energy is variable the shock absorber 30 may stop the cam 11 before contacting with the stopper 19.) It is also a merit of this embodiment that there occurs no error of phase adjustment from over-run due to inertia of the main shaft 2.

Figure 8:
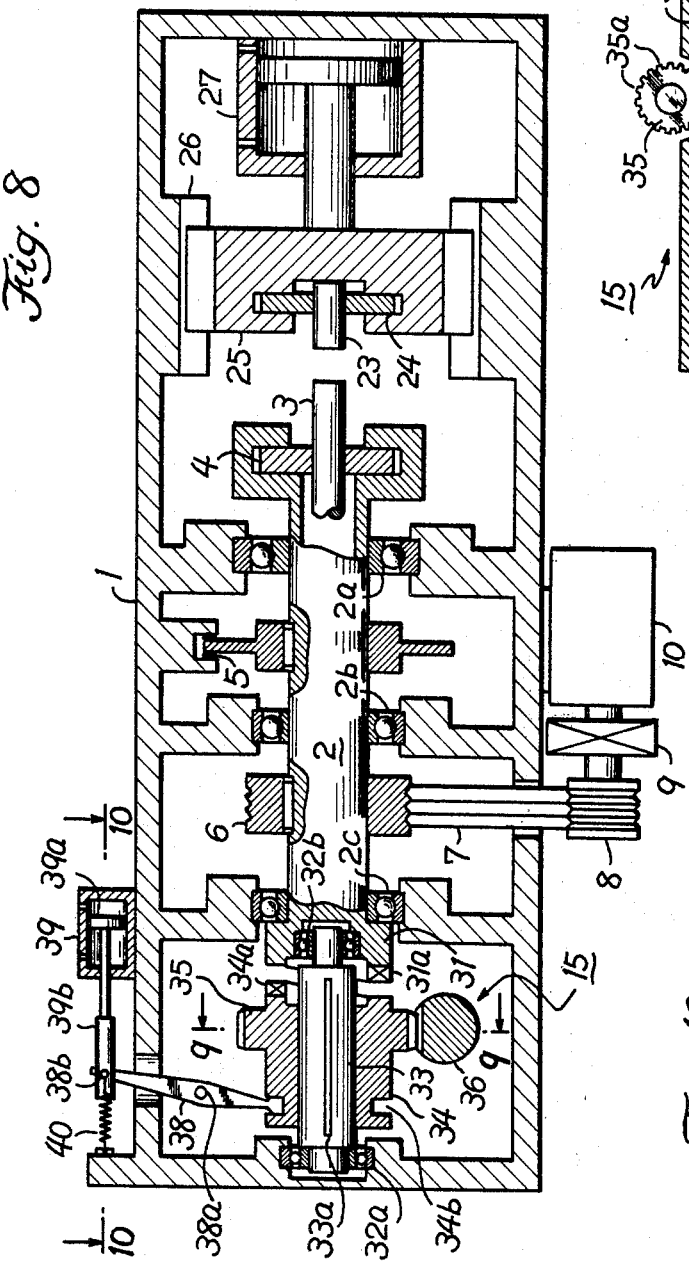
FIG. 8 is a cross sectional view corresponding to FIG. 3 for another embodiment of the present invention.

Another preferred embodiment of the present invention is shown in FIG. 8 where the main shaft 2 is rotatably supported by ball bearings 2a, 2b, 2c, etc., and is integrally provided a clutch disc 31 having an abutting surface 31a on one end. Confronting to said clutch disc 31, another clutch disc 34 is slidably mounted by a key 33a on a short shaft 33 which is rotatably supported at one end by a ball bearing 32a on the frame 1 and at the other end by a ball bearing 32b on the clutch disc 31.

Figure 9:
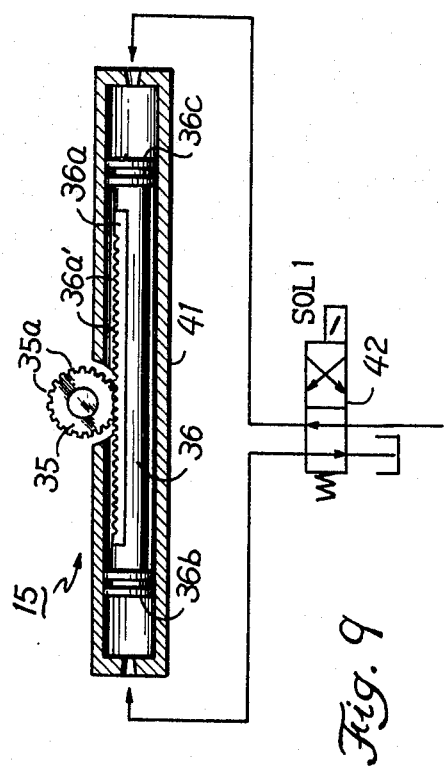
FIGS. 9 and 10 are cross sectional views taken along the line 9—9 and the line 10—10 of FIG. 8, respectively.

On the clutch disc 34 there is integrally provided a pinion gear 35 driven by a rack 36a meshed therewith both ends of which form pistons 36b, 36c slidably engaged with a hydraulic cylinder 41 controlled conventionally by a directional control valve 42, etc., as shown FIG. 9. Teeth 35a of the gear 35 mesh with teeth 36a' of the rack 36a to rotate the clutch disc 34.

Operatively to engage or disengage the clutch disc 34 with said clutch disc 31 there is provided a lever 38 pivotably supported by a fixed pin 38a and engaged on one end with a groove 34b on the disc 34. At the other end of the lever 38, referring to FIG. 10, there is pivotably mounted a pin 38b which is pulled by a pair of springs connected to the frame 1 on one side and on the other side is connected to a york 39b, an integral part of a piston 39a slidably engaged in a hydraulic cylinder 39 mounted on the frame 1.

The operation of the second embodiment will be described hereinafter by referring to FIG. 8 again. Two workpieces 3 and 23 are clamped by the chucks 4 and 24 at a predetermined phase angle respectively and the workpiece 3 is started to rotate by the motor 10 under the condition that the clutch 9 is in engagement and the brake 5 is released. When the speed of the workpiece 3 comes to a predetermined value $N_1$, the other workpiece 23 is advanced in the left direction in the drawing to make a contact with the other 3, whereby the heating step (process) term begins.

By setting a signal from the beginning of the contact, the contacting pressure between the workpieces is increased to a predetermined value $P_1$ and is kept for a certain period to heat the contacting parts thereof by friction. The heating step term comes to the end at a time when the contacting parts are heated enough to be welded and the time is controlled by a preset time of a timer or by a preset approach amount. At the end of the heating step term starts the upsetting term, by the signal of the start the clutch 9 is released to cut off the input from the motor 10, the brake 5 is operated, and the contacting pressure is increased to a vale $P_2$ for upsetting by operating the actuator 27. These operations are common to conventional apparatus and methods, however, in the present invention the alternate driver 15 and the clutch operating mechanism start as disclosed hereinafter at the beginning of the upsetting term or a little later.

Figure 10:
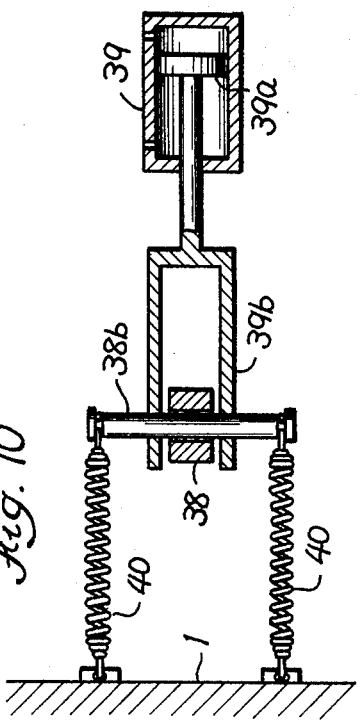

Referring to FIG. 9 the hydraulic piston 36 in the cylinder 41 is actuated conventionally by a solenoid operated directional control valve 42 to rotate the gear 35 or the clutch disc 34 at a constant adjusting speed $N_2$. Referring to FIG. 10, the hydraulic piston 39a is operated to the left direction in the drawing the pin 38b is moved leftward by the pulling force of the spring 40 to swing the lever 38 anti-clockwise to force the clutch disc 34 to engage with the clutch disc 31. The adjusting speed $N_2$ of the clutch disc 34 is, e.g., 200 rpm (FIG. 12) and so far as the speed $N_2$ is slower than the speed $N_1$ of the main shaft 2 which is rapidly decreasing, the clutch disc 34 is sliding on the clutch disc 31 of the main shaft 2 as shown in FIG. 11 (A) and (B), but when the speed $N_1$ becomes once lower than the speed $N_2$ the clutch disc 34 begins to drive the main shaft 2 in return and eventually at the adjusting speed $N_2$ as shown in FIG. 12 (B).

Before the speed of the main shaft 2 drops to the adjusting speed $N_2$ the brake 5 has been released by a suitable signal such as timing-out of a timer (not shown).

After the speed of the main shaft 2 becomes $N_2$ the speed $N_2$ is kept constant, e.g., 200 rpm between the two workpieces 3 and 23 under the upset pressure $P_2$, but the speed $N_2$ instantly drops to zero at the stroke end of the piston 36, with adjusted phase angle and the welded workpieces are chilled under the pressure $P_2$.

In the above embodiment there is shown an example which the phase adjustment is accomplished only once during 360° angle of rotation and each clutch disc 31 or 34 has one abutting surface 31a or 34a. In case either workpiece has a 180° symmetry form the clutch discs should be provided with two abutting surfaces arranged with a pitch of 180°, respectively.

It should be noted that those adjustments can be accomplished without once stopping the rotating workpiece, but under a certain relative rotation speed $N_2$. In this embodiment the phase angle between the two workpieces has been adjusted before the start of relative rotation, i.e., the angle has been adjusted therebetween in the condition of the clutch discs, 31a and 34a being engaged and the piston 36 being at the stroke end thereof.

Therefore the workpieces can be always welded together having a correct phase angle when they stop at the stroke end or a preset position of the piston 36 after various steps of processes previously described.

The effects of the present embodiments are as follows: Firstly, the phase adjustment between the workpieces is carried out during rotation and no twisting is applied therebetween during chilling thereof so that the quality of the product is constant. Secondly, introduction of the alternate driver enables to decrease shock and noise by selecting a suitable adjusting speed. Thirdly, the present invention enables to widen the application field by adding small amendment to conventional apparatus.

Figure 13:
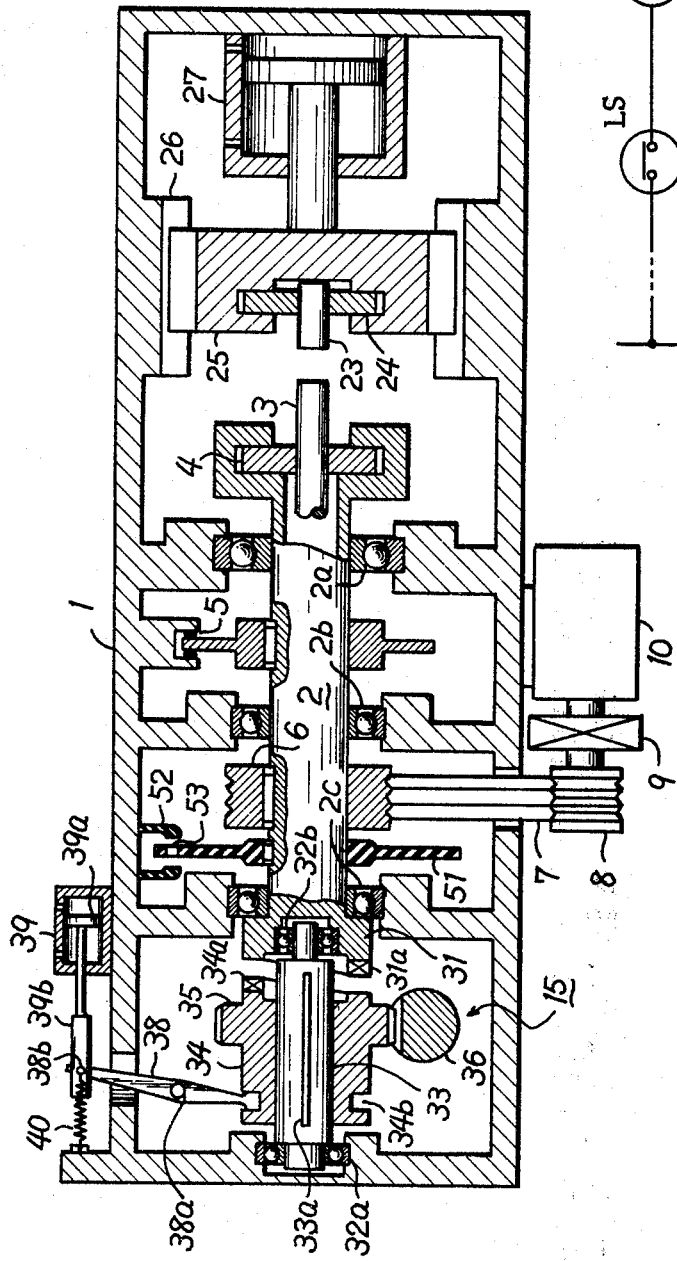
FIG. 13 is a cross sectional view corresponding to FIG. 3 for another embodiment of the present invention.

Still another embodiment of the present invention is shown in FIG. 13, which is a modification of the previous embodiment, i.e., modified by adopting a sensor and pulser system. Therefore, the description common to the previous embodiment is omitted.

Referring to FIG. 13, a disc 51 having a hole 53 bored near the periphery thereof is fixedly mounted on the main shaft 2. A sensor 52 which is incorporated with a pulser is mounted on the frame 1. The sensor 52 is also provided with a pulse receiver and a counter therefor (both not shown), so that the sensor counts integral number of rotation or integral angle of rotation.

Now the operation of the third embodiment will be described hereinafter by referring to FIGS. 13, 14 and 15.

The workpieces 3 and 23 are firmly secured by chucks 4 and 24, respectively, at a predetermined phase angle. The main shaft 2 holding the workpieces 3 is driven by the motor 10 at a relatively high running speed $N_1$ under the condition of the clutch 9 being in engagement and the brake 5 being released, then the other workpiece 23 is advanced to the workpiece 3 by operation of the actuator 27 to make a contact therebetween.

Figure 15:
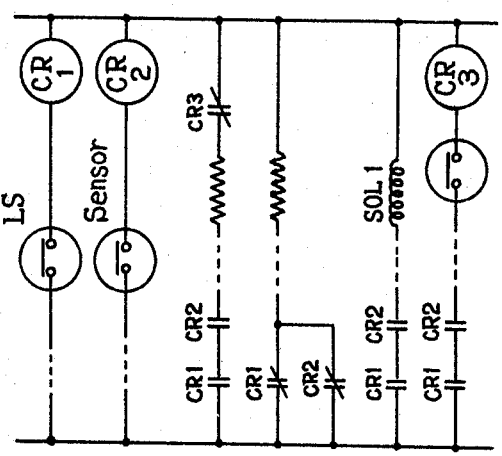
FIG. 15 shows an electric diagram for the embodiment shown in FIG. 13.

After a term of the heating process due to friction, referring to FIG. 15, the relay CR1 is energized by a limit switch LS (not shown in FIG. 13) operated by mutual approaching of the workpieces and by a signal from the sensor 52 which monitors a particular opening 53 on the rotating disc 51, the relay CR2 is energized, whereby the upsetting term starts. (This corresponds to the point A in FIG. 14.) Then the clutch 9 is released and the brake 5 is operated. When the two relays CR1, CR2 are energized, the solenoid SOL1 (in FIG. 9) is energized to operate the piston 36, i.e., the clutch 14 is to be driven at a constant speed $N_2$ (This corresponds to the point A' in FIG. 14).

Referring to FIGS. 14 and 15, when the integral number of rotation (or total rotation angle) counted by a digital counter (not shown) provided with the pulser 52 becomes equal to a certain preset number of pulses (The time corresponds to the point B in FIG. 14), the relay CR3 is energized by the signal obtained from the pulser 52 and thus the brake 5 is released. (The time corresponds to the point B or A is expressed simply as the time B or A hereinafter.) It is understood that the phase angle between the two workpieces at this time B is the same in every welding cycle.

It is also experimentally known by recent researches in case of conventional welding that the total number of rotation during the upsetting term does not exceed several revolutions even when the speed before upsetting is more than 2000 rpm and the variation of the total number of rotation is less than a half rotation, and the variation is closely related with the variation of the upset amount and with that of the total length of the welded workpieces.

In this embodiment it is of course intended to minimize the variation of the total number of rotation. The time A to begin decreasing the rotation of the main shaft exactly coincides with the time B to start the rotation of the clutch 34, and moreover the phase relation is designed to be the same as the time B in every welding cycle, so that the phase error $\theta$ must be very small at the time C when the rotating speed of the clutch disc 31 and that of the clutch disc 34 become equal. For that it takes usually a sort time $T_{C-D}$ because the speed of the clutch disc 31 may drop once to a speed designated by a point D. It is also preferable for minimizing the time $T_{C-D}$ to select the time B as near as possible to the time C and that is attainable after a few trials and errors.

It should be understood that the third embodiment is favored with the following merits:
a. the adjustment of the phase angle between two workpieces is accomplished without stopping the relative rotation, but under a predetermined constant speed,
b. the relative speed before stopping is kept to a relatively low value so that there occurs no considerable shock or noise,
c. the variation of upset amount can be minimized and the total length is kept almost constant,
d. the variation $\theta$ of phase angle before adjustment can be minimized.

What we claim:
1. In an apparatus for friction welding metal workpieces at a predetermined phase angle having
   a. a base frame;
   b. a rotatable main shaft rotatably supported by said base frame and including a first chuck means for holding a first workpiece;
   c. a first driving means for driving said main shaft at a relatively high speed;
   d. a clutch means for enabling instantaneous disengagement of the driving torque of said first driving means;
   e. a braking means applicable to said main shaft for braking said main shaft;
   f. a second chuck means for holding a second workpiece, wherein both of said chuck means hold both of said workpieces in a particular phase relation;
   g. movable means for moving one of said chuck means toward and away from the other chuck means in alignment therewith; and
   h. a pressure-applying means for providing a contacting force to generate heat by friction between said workpieces, the improvement comprising:
      1. movable stopping means selectively engageable with said main shaft for stopping the rotation of said main shaft, said movable stopping means assuring that said workpieces are welded together with a predetermined phase angle;
      2. second driving means including a hydraulically operated rack and a pinion gear engaging with said rack for driving said main shaft at a relatively low constant speed with respect to the normal running speed of said first driving means, said second driving means continuously driving said main shaft at low constant speed before said movable stopping means stops the rotation of said main shaft, said second driving means rotating said main shaft with a torque sufficient to overcome the fricional force between said workpieces when said pressure-applying means provides the contacting force; and
      3. means for stopping said second driving means at a given position of the advancing stroke of said rack.

2. An apparatus according to claim 1 wherein said stopping means includes a first clutch disc encircling said main shaft and said second driving means includes
   a second clutch disc engaging with said pinion gear; and
   an actuator in electrical connection with said rack, said rack being by said actuator and said second clutch disc engaging with said first clutch disc for stopping the rotation of said main shaft.

3. An apparatus according to claim 1, further including a one-way clutch means having an outer race engaging said main shaft and having a rotatable member affixed to the outer race of said one-way main shaft, and wherein said second driving means includes a hydraulic motor engageable with said rotatable member affixed to the outer race of said one-way clutch means.

4. An apparatus for friction welding metal workpieces as claimed in claim 1, wherein
   said stopping means comprises a cam plate having at least an abutting surface and a movable stopper to abut said abutting surface.

5. An apparatus for friction welding metal workpieces as claimed in claim 4, wherein
   said apparatus further comprises a sensor, a digital counter and a pulser, and wherein said sensor to monitor an opening provided on a disk rotatable with said main shaft.

6. A method of friction welding metal workpieces comprising the steps of:
   installing two workpieces in each of their respective chucks, wherein each of said chucks hold both of said workpieces in a particular phase relation therebetween;
   rotating a shaft of one of said chucks at a relatively high speed using a first prime mover and a first clutch;
   advancing one of said chucks toward the other chuck until said two workpieces are contacting each other;
   releasing said first clutch thereby cutting off the power of said first prime mover and simultaneously braking said shaft and increasing the contacting pressure of said workpieces, allowing the rotation of said shaft to decrease;
   driving said shaft, by means of a movable stopping means, i.e., a second prime mover including a hydraulically operated rack at a relatively low constant speed with respect to the speed of said shaft driven by said first prime mover, driving said shaft with a torque sufficient to overcome the friction between said two workpieces at said constant speed at least for a certain time while keeping a particular phase relation between said shaft and said second prime mover; and stopping said rotating workpieces by means of said second prime mover at a certain predetermined position on the advancing stroke of said rack, to attain a particular phase rotation between said two workpieces.

* * * * *

UNITED STATES PATENT AND TRADEMARK OFFICE
CERTIFICATE OF CORRECTION

PATENT NO. : 3,972,465
DATED : August 3, 1976
INVENTOR(S) : TAKAOKA et al

It is certified that error appears in the above-identified patent and that said Letters Patent are hereby corrected as shown below:

[57] Abstract, line 9, after "from" insert --proper--

Column 5, line 26, --value $P_2$--

Signed and Sealed this

Twenty-fifth Day of January 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,972,465
DATED : August 3, 1976
INVENTOR(S) : Hikaru Takaoka et al.

It is certified that error appears in the above-identified patent and that said Letters Patent are hereby corrected as shown below:

[73] Assignee: Kabushiki Kaisha Toyoda
Jidoshokki Seisakusho, Japan

Signed and Sealed this

Fifteenth Day of March 1977

[SEAL]

Attest:

RUTH C. MASON
*Attesting Officer*

C. MARSHALL DANN
*Commissioner of Patents and Trademarks*